United States Patent
Dalmatov et al.

(10) Patent No.: US 11,262,920 B2
(45) Date of Patent: Mar. 1, 2022

(54) MAPPED RAID (REDUNDANT ARRAY OF INDEPENDENT DISKS) WITH DRIVE HEALTH AWARE PROTECTION GROUPS

(71) Applicant: EMC IP Holding Company LLC, Hopkinton, MA (US)

(72) Inventors: Nickolay Dalmatov, Saint Petersburg (RU); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/038,869

(22) Filed: Sep. 30, 2020

(65) Prior Publication Data

US 2021/0286529 A1 Sep. 16, 2021

(30) Foreign Application Priority Data

Mar. 13, 2020 (RU) ................................ 2020110748

(51) Int. Cl.
*G06F 3/06* (2006.01)

(52) U.S. Cl.
CPC .......... *G06F 3/0619* (2013.01); *G06F 3/0631* (2013.01); *G06F 3/0647* (2013.01); *G06F 3/0653* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,782,465 B1 * | 7/2014 | Foley | G06F 11/008 714/6.22 |
| 9,892,014 B1 * | 2/2018 | Hickey | G06F 3/0616 |
| 10,013,323 B1 | 7/2018 | Puhov et al. | |
| 10,346,057 B1 | 7/2019 | Martin et al. | |
| 10,402,249 B2 | 9/2019 | Xiao et al. | |
| 10,649,892 B2 | 5/2020 | Gao et al. | |
| 10,664,363 B2 | 5/2020 | Liu et al. | |
| 10,678,759 B2 | 6/2020 | Yan et al. | |
| 11,126,501 B2 | 9/2021 | Liu et al. | |
| 11,150,991 B2 | 10/2021 | Ma et al. | |
| 2004/0267708 A1 * | 12/2004 | Rothman | G06F 11/2284 |
| 2005/0182992 A1 * | 8/2005 | Land | G06F 3/0689 714/701 |
| 2009/0271657 A1 * | 10/2009 | McCombs | G06F 11/004 714/6.2 |

* cited by examiner

*Primary Examiner* — Michael Alsip
(74) *Attorney, Agent, or Firm* — BainwoodHuang

(57) ABSTRACT

Mapped RAID protection is provided for data written into multiple logical RAID spaces, and the data written to each one of the RAID spaces is stored in data storage drives contained in a corresponding one of multiple protection groups of data storage drives. Drive health information is collected for each data storage drive contained in the protection groups, and a faultiness level of each individual data storage drive in the protection groups is calculated based on the drive health information. A faultiness-balanced distribution of the data storage drives across the protection groups is then generated based on the calculated faultiness levels of the individual data storage drives.

13 Claims, 4 Drawing Sheets

MAPPED RAID (REDUNDANT ARRAY OF INDEPENDENT DISKS) WITH DRIVE HEALTH AWARE PROTECTION GROUPS

RELATED APPLICATIONS

This application claims priority to Russian Patent Application number 2020110748, filed in the Russian Patent Office on Mar. 13, 2020, entitled MAPPED RAID (REDUNDANT ARRAY OF INDEPENDENT DISKS) WITH DRIVE HEALTH AWARE PROTECTION GROUPS, the entire contents of which is hereby incorporated herein by reference.

TECHNICAL FIELD

The present disclosure relates generally to intelligent data storage systems that provide mapped RAID (Redundant Array of Independent Disks) data protection, and more specifically to technology for providing mapped RAID with drive health aware protection groups.

BACKGROUND

Data storage systems are arrangements of hardware and software that may include one or more storage processors coupled to non-volatile data storage drives, such as solid state drives and/or magnetic disk drives. The storage processors service host I/O operations received from physical and/or virtual host machines ("hosts"). The I/O operations may specify one or more storage objects (e.g. logical disks or "LUNs") hosted by the storage system that are written to and read from by the hosts. The storage processors run software that manages incoming I/O operations and performs various data processing tasks to organize and secure host data that is received from the host machines and stored on the non-volatile data storage drives.

Some data storage systems provide RAID (Redundant Array of Independent Disks) technology. Traditional RAID is a data storage virtualization/protection technology that combines multiple physical drives into a single logical unit of non-volatile storage to provide data redundancy and/or performance improvement. Data may be distributed across the drives using one of several RAID technologies, referred to as RAID levels, depending on the desired level of redundancy and performance. Some RAID levels employ data striping ("striping"). In general, striping involves segmenting received host data into logically sequential blocks (e.g. sequential blocks in a logical address space of a logical storage object), and then storing data blocks written to consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more parity blocks are additionally maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block. Other levels of RAID protection provide fault tolerance by maintaining mirror copies of data on multiple drives.

One example of a RAID level that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk may also be kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID levels may provide a higher level of data protection, e.g. data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

SUMMARY

Data storage systems providing traditional RAID (Redundant Array of Independent Disks) data protection have technical limitations, including limitations with regard to the ability to conveniently add new drives. Specifically, traditional RAID systems have not supported the addition of new drives on an individual disk basis, but have instead required that new storage capacity be added only in increments equal to the number of drives required to support the specific RAID configuration, i.e. equal to the width of the RAID stripe being used. Accordingly, for 4D+1P RAID-5 level technology, new drives can only be added to a traditional RAID system in increments of five drives at a time. For 4D+2P RAID-6 technology, new drives can only be added to traditional RAID systems in increments of six drives. As the capacity of individual drives has increased over time with the introduction of new storage technologies, the inflexibility of traditional RAID systems with regard to adding new capacity became increasingly burdensome and impractical.

Mapped RAID technology improves on traditional RAID technology by allowing for the addition of individual storage drives to a RAID protected data storage system in order to conveniently increase storage capacity. In mapped RAID technology, each physical data storage drive contained in a "protection group" of data storage drives is divided into multiple contiguous regions of physical non-volatile data storage referred to as "drive extents". Sets of drive extents are allocated from the physical data storage drives in a protection group to logical "RAID extents" that are logically contiguous address regions contained within a larger logical address space referred to as the "RAID space" that corresponds to the protection group. A data storage system may include multiple protection groups, each one of which provides drive extents for allocation to the RAID extents contained in the RAID space corresponding to that protection group. The number of drive extents allocated to each individual RAID extent may be the same as the number of disks used in a traditional RAID system to store data blocks and parity information for the same RAID level that is provided by that RAID extent. Data structures such as one or more RAID mapping tables are used to associate sets of allocated drive extents with their corresponding RAID extents. Host I/O operations may result in I/O operations being performed by the storage processor that each indicate a logical address within a specific RAID space. Each logical address is mapped by RAID mapping logic in the storage processor to a specific RAID extent in a specific RAID space, and then to corresponding physical locations within the set of drive extents that are allocated to that RAID extent. In order for mapped RAID to operate correctly, each drive extent within a set of drive extents allocated to an individual RAID extent must be located on a different physical data storage drive within the protection group for the RAID space that contains the RAID extent.

Each RAID extent contained in a RAID space may independently provide a corresponding level of RAID protection. Accordingly, individual RAID extents in a given RAID space may each provide the same, or different levels of RAID protection. Because the set of drive extents allocated to an individual RAID extent stores blocks of data and parity information in stripes that are defined by the specific RAID level corresponding to the RAID extent, each RAID extent may be allocated a number of drive extents that corresponds to the RAID level provided by that RAID extent. For example, RAID extents providing 4D+1P RAID-5 protection may each be allocated five drive extents in order to store the four blocks of data and one block of parity information contained in each stripe defined by 4D+1P RAID-5 across different drive extents. In another example, RAID extents providing 4D+2P RAID-6 RAID protection may each be allocated five drive extents in order to store the four blocks of data and two blocks of parity information in each stripe defined by 4D+2P RAID-6 across different drive extents.

Mapped RAID advantageously allows large numbers of data storage drives to be contained within each protection group. The number of data storage drives contained in an individual mapped RAID protection group may be larger than the number of blocks in each RAID stripe defined by the specific RAID level provided by any one of the RAID extents contained in the RAID space corresponding to the protection group. Accordingly, a mapped RAID protection group from which drive extents are allocated to support a RAID space containing one or more RAID extents providing 4D+2P RAID-6 may contain more than six data storage drives from which drive extents are allocated to RAID extents in that RAID space. In some cases, a protection group may even contain a number of data storage drives that is a multiple of the number of blocks in the RAID stripes defined by the RAID extents in the corresponding RAID space.

At any given point in time during the operation of a data storage system, each individual data storage drive in the protection groups of a data storage system providing mapped RAID has its own independent level of faultiness. For example, over time, individual data storage drives may exhibit their own specific levels of faultiness in terms of faultiness parameters such as read operation errors, seek operations errors, relocated sectors, decreasing throughput performance, program/erase operation failures, and/or other types of faultiness parameters. In general, the level of faultiness for an individual data storage drive may represent a probability that the data storage drive will fail in the future.

The level of faultiness of each individual data storage drive may change over time. For example, the level of faultiness of a data storage drive may increase as the data storage drive ages and/or experiences increased utilization. As the level of faultiness of a data storage drive increases, the drive becomes less reliable, but may still be useable. In some cases, newer, more recently added data storage drives may have lower faultiness levels than older, previously added data storage drives.

Previous data storage systems providing mapped RAID have exhibited shortcomings in terms of overall reliability as individual data storage drives exhibit changing levels of faultiness. For example, as the number of data storage drives having high faultiness levels in an individual protection group increases, the probability that at any given time one or more of the data storage drives in the protection group will fail also increases. Accordingly, also as the number of data storage drives with high faultiness levels in a protection group increases, the probability that multiple data storage drives in that protection group will concurrently fail also increases, thus increasing the probability of data loss with regard to data written into the corresponding RAID space. However, previous data storage systems have allowed faultier data storage drives to become unevenly distributed across the multiple protection groups of the data storage system. For example, an uneven distribution of faulty data storage drives across mapped RAID protection groups may arise over time due to the addition of relatively newer and less faulty data storage drives to specific protection groups, and/or due to the usage level and/or performance degradation of individual data storage drives. As relatively faulty data storage drives become more and more unevenly distributed across the protection groups, and therefore increasingly concentrated within some subset of the protection groups, the potential for data loss in that subset of the data storage system's protection groups increases disproportionately, thus decreasing the overall reliability of the data storage system.

In order to address the above described and other shortcomings of previous data storage systems, new technology is disclosed herein that provides mapped RAID with drive health aware protection groups. In the disclosed technology, mapped RAID protection is provided for data written into multiple logical RAID spaces, and the data written to each one of the RAID spaces is stored in data storage drives contained in a corresponding one of multiple protection groups of data storage drives. Drive health information is collected for each data storage drive contained in the protection groups, and a faultiness level of each individual data storage drive is calculated based on the drive health information. A faultiness-balanced distribution of the data storage drives across the protection groups is then generated based on the calculated faultiness levels of the individual data storage drives.

In some embodiments, a determination may be made as to whether the faultiness-balanced distribution of the data storage drives across the protection groups matches a current distribution of the data storage drives across the protection groups. In response to the faultiness-balanced distribution of the data storage drives across the protection groups not matching the current distribution of the data storage drives across the protection groups, the disclosed technology may automatically redistribute the data storage drives across the protection groups according to the faultiness-balanced distribution of the data storage drives. Automatically redistributing the data storage drives across the protection groups of data storage drives according to the faultiness-balanced distribution of the faulty data storage drives may include moving at least one of the data storage drives from a first one of the protection groups to a second one of the protection groups.

In some embodiments, determining the faultiness-balanced distribution of the faulty data storage drives across the protection groups may include determining a distribution of the data storage drives across the protection groups that minimizes a range of values of a per-protection group faultiness metric that is calculated for individual protection groups based on the faultiness levels of the individual data storage drives.

In some embodiments, the values of the faultiness metric calculated for the individual protection groups may further be based on the sizes of the individual protection groups.

In some embodiments, the sizes of the individual protection groups used to calculate the values of the faultiness metric for the individual protection groups may be a total capacity of each protection group.

In some embodiments, the sizes of the individual protection groups used to calculate the values of the faultiness metric for the individual protection groups may be an amount of data stored in each protection group.

In some embodiments, the faultiness metric calculated for each protection group may be a size of the protection group divided by a sum of the faultiness levels of the data storage drives contained in the protection group.

In some embodiments, the disclosed technology may determine whether the faultiness-balanced distribution of the data storage drives across the protection groups provides a significant improvement over a current distribution of the data storage drives across the protection groups. The disclosed technology may then automatically redistribute the data storage drives across the protection groups according to the faultiness-balanced distribution of the data storage drives in response to determining that the faultiness-balanced distribution of the data storage drives across the protection groups provides a significant improvement over the current distribution of the data storage drives across the protection groups.

Embodiments of the disclosed technology may provide significant improvements over previous data storage technology. For example, by generating a faultiness-balanced distribution of data storage drives across multiple protection groups, the disclosed technology enables drive faultiness to be evenly distributed across the protection groups. In this way, the disclosed technology may avoid uneven concentration of data storage drive faultiness into certain protection groups, thus reducing the likelihood of concurrent data storage drive failure within individual protection groups. The disclosed technology may therefore improve the overall reliability of the data storage system by lessening the risk of data loss due to concurrent data storage drive failures occurring within an individual protection group of data storage drives.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein may improve over previous technologies by providing drive health aware protection groups in a data storage system that uses mapped RAID. The disclosed technology provides mapped RAID protection for data written into multiple logical RAID spaces. Data written to each one of the RAID spaces is stored in data storage drives contained in a corresponding one of multiple protection groups of data storage drives. The disclosed technology collects drive health information for each individual data storage drive contained in the protection groups, and calculates a faultiness level of each individual data storage drive based on the drive health information. The disclosed technology then generates a faultiness-balanced distribution of the data storage drives across the protection groups based on the calculated faultiness levels of the individual data storage drives. In response to detecting that the faultiness-balanced distribution of the data storage drives across the protection groups does not match a current distribution of the data storage drives across the protection groups, and/or in response to detecting that the faultiness distribution of the data storage drives across the protection groups provides a significant improvement over the current distribution of the data storage drives across the protection groups, the disclosed technology may automatically redistribute the data storage drives across the protection groups according to the faultiness-balanced distribution of the data storage drives that was generated.

Figure 1:
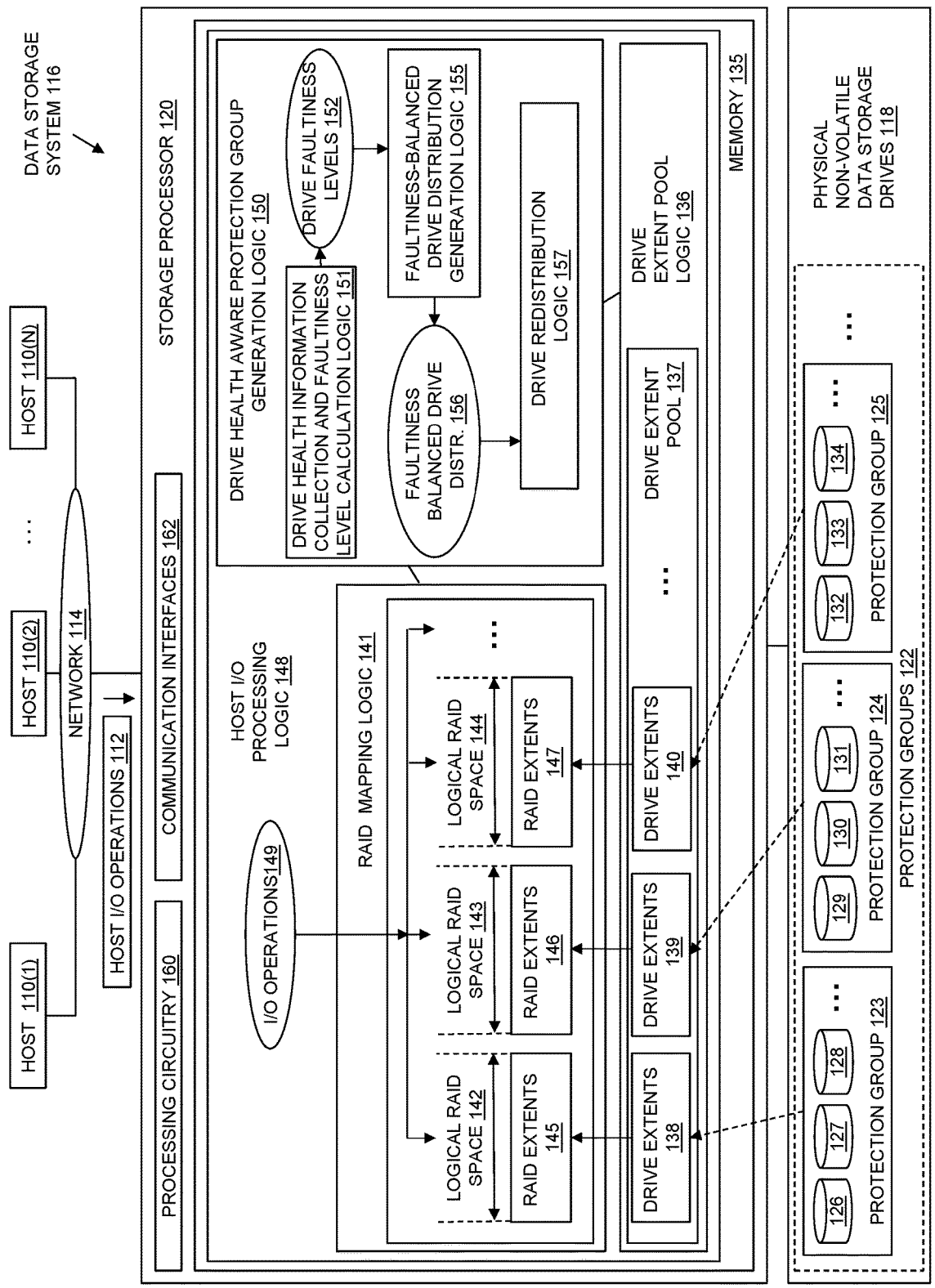
FIG. 1 is a block diagram showing an example of a data storage system in which an example of the disclosed technology is embodied.

FIG. 1 is a block diagram showing an operational environment for the disclosed technology, including an example of a data storage system in which the disclosed technology may be embodied. FIG. 1 shows some number of physical and/or virtual Host Computing Devices 110, referred to as "hosts" and shown for purposes of illustration by Hosts 110(1) through 110(N). The hosts access non-volatile data storage provided by Data Storage System 116, for example over one or more networks, such as a local area network (LAN), and/or a wide area network (WAN) such as the Internet, etc., and shown for purposes of illustration in FIG. 1 by Network 114, which may be communicably coupled to Storage Processor 120 through Communication Interfaces 162. Data Storage System 116 may include at least one Storage Processor 120 and Physical Non-Volatile Data Storage Drives 118. No particular hardware configuration is required, and Storage Processor 120 may be embodied as any specific type of device that is capable of processing host input/output (I/O) operations received from Hosts 110 (e.g. I/O read and I/O write operations, etc.).

The Physical Non-Volatile Data Storage Drives 118 of the Data Storage System 116 may include physical data storage drives such as solid state drives, magnetic disk drives, hybrid drives, optical drives, and/or other specific types of drives. Physical Non-Volatile Data Storage Drives 118 may be directly physically connected to and/or contained within Storage Processor 120, and/or may be communicably connected to Storage Processor 120 by way of one or more computer networks.

A Memory 135 in Storage Processor 120 stores program code that is executable on Processing Circuitry 160. Memory 135 may include volatile memory (e.g. RAM), and/or other types of memory. The Processing Circuitry 160 may, for example, include or consist of one or more microprocessors, e.g. central processing units (CPUs), multi-core processors, chips, and/or assemblies, and associated circuitry. Processing Circuitry 160 and Memory 135 together form control circuitry, which is configured and arranged to carry out various methods and functions as described herein. The Memory 135 stores a variety of software components that may be provided in the form of executable program code. For example, Memory 135 may include software components such as Host I/O Processing Logic 148. When program code in Memory 135 is executed by Processing Circuitry 160, Processing Circuitry 160 is caused to carry out the operations of the software components. Although certain software components are shown and described for purposes of illustration and explanation, those skilled in the art will recognize that Memory 135 may include various other software components, such as an operating system, various applications, other processes, etc.

During operation, Drive Extent Pool Logic 136 generates Drive Extent Pool 137 by first dividing each one of the physical non-volatile data storage drives into multiple, equal size drive extents, each of which consists of physically contiguous non-volatile data storage located on a single drive. For example, Drive Extent Pool Logic 136 may divide each one of the physical non-volatile data storage drives into a fixed number of equal size drive extents of physically contiguous non-volatile storage, and then add an indication of each one of the resulting drive extents to Drive Extent Pool 137.

The size of the drive extents into which the physical non-volatile data storage drives are divided may, for example, be the same for every physical non-volatile data storage drive. Various specific sizes of drive extents may be used in different embodiments. For example, in some embodiments each drive extent may have a size of 10 gigabytes. Larger or smaller drive extent sizes may be used in the alternative. Any specific number of physical non-volatile data storage drives may be contained in Physical Non-Volatile Data Storage Drives 118 and divided into equal size drive extents to generate Drive Extent Pool 137.

Physical Non-Volatile Data Storage Drives 118 is divided into some number of protection groups, and each protection group may contain any specific number of data storage drives. The assignments of data storage drives to protection groups may be stored in one or more data structures or the like that are maintained by and within RAID Mapping Logic 141. For purposes of illustration, Protection Groups 122 is shown including at least Protection Group 123, Protection Group 124, and Protection Group 125. Further for purposes of illustration, Protection Group 123 is shown containing at least data storage drives 126, 127, and 128, Protection Group 124 is shown containing at least data storage drives 129, 130, and 131, and Protection Group 125 is shown containing at least data storage drives 132, 133, and 134. An individual data storage drive may be contained only within a single protection group.

While processing Host I/O Operations 112, Host I/O Processing Logic 148 generates I/O Operations 149 that are performed by Storage Processor 120 to store data indicated by Host I/O Operations 112 onto Physical Non-Volatile Data Storage Drives 118 with RAID protection. To support processing of I/O Operations 149, RAID Mapping Logic 141 maps the I/O operations in I/O Operations 149 onto multiple logical RAID spaces, shown for purposes of illustration as including Logical RAID Space 142, Logical RAID Space 143, and Logical RAID Space 144. Each one of the logical RAID spaces is made up of multiple RAID extents. Each RAID extent is a separate, logically contiguous region of addressable data storage within the logical RAID space in which it is contained. In the example of FIG. 1, Logical RAID Space 142 contains RAID Extents 145, Logical RAID Space 143 contains RAID Extents 146, and Logical RAID Space 144 contains RAID Extents 147.

Each RAID extent contained in a logical RAID space independently provides a corresponding level of RAID protection. Individual RAID extents in a given logical RAID space may each provide the same, or different levels of RAID protection. Each RAID extent may be allocated a number of drive extents from Drive Extent Pool 137 that corresponds to the RAID level provided by that RAID extent. For example, RAID extents providing 4D+1P RAID-5 protection may each be allocated five drive extents in order to store the four blocks of data and one block of parity information contained in each stripe defined by 4D+1P RAID-5 across different drive extents. In another example, RAID extents providing 4D+2P RAID-6 RAID protection may each be allocated five drive extents in order to store the four blocks of data and two blocks of parity information in each stripe defined by 4D+2P RAID-6 across different drive extents.

Each individual logical RAID space corresponds to one and only one of the protection groups in Protection Groups 122. For example, Logical RAID Space 142 corresponds to Protection Group 123, Logical RAID Space 143 corresponds to Protection Group 124, and Logical RAID Space 144 corresponds to Protection Group 126. RAID Mapping Logic 141 and/or Drive Extent Pool Logic 136 allocate drive extents from Drive Extent Pool 137 to specific RAID extents such that the drive extents allocated to any given RAID extent are all located on the data storage drives contained within the protection group that corresponds to the logical RAID space that contains the RAID extent. Accordingly, Drive Extents 138 that are allocated to RAID Extents 145 in Logical RAID Space 142 are all located on data storage drives contained in Protection Group 123, Drive Extents 139 that are allocated to RAID Extents 146 in Logical RAID Space 143 are all located on data storage drives contained in Protection Group 124, and Drive Extents 140 that are allocated to RAID Extents 147 in Logical RAID Space 144 are all located on data storage drives contained in Protection Group 125. RAID Mapping Logic 141 may include one or more data structures, such as one or more RAID mapping tables, that are used to associate sets of allocated drive extents with their corresponding RAID extents.

Each I/O operation in I/O Operations 149 indicates a logical address contained within a specific one of the RAID spaces, e.g. a logical address within Logical RAID Space 142, Logical RAID Space 143, or Logical RAID Space 144.

RAID Mapping Logic 141 maps the logical address of each I/O operation to the specific RAID space in which it is contained, then to a specific RAID extent within that RAID space, and then to corresponding physical locations within the set of drive extents that are allocated to that RAID extent. Host I/O Processing Logic 148 can then securely store the data indicated by the I/O operation (e.g. host data indicated by a host write I/O operation) onto the set of drive extents allocated to that RAID extent, according to the RAID level provided by the RAID extent. In this way, Host I/O Processing Logic 148 securely stores data written to each one of the logical RAID spaces 142, 143, and 144 onto the data storage drives contained in the corresponding one of the protection groups 123, 124, and 125. For example, data written to Logical RAID Space 142 is stored in the data storage drives contained in Protection Group 123, data written to Logical RAID Space 143 is stored in the data storage drives contained in Protection Group 124, and data written to Logical RAID Space 144 is stored in the data storage drives contained in Protection Group 125.

For example, for a write operation in I/O Operations 149, RAID Mapping Logic 141 may determine that a logical address indicated by the operation is contained within Logical RAID Space 142. RAID Mapping Logic 141 maps the logical address of the I/O operation to a specific RAID extent within RAID Space 142, and then to corresponding physical locations within specific drive extents in Drive Extents 138 that are allocated to that RAID extent from Protection Group 123. Host I/O Processing Logic 148 then stores the data indicated by the I/O operation to the physical locations within the drive extents in Drive Extents 138, according to the RAID level provided by the specific drive extent, causing the data indicated by the I/O operation indicating Logical RAID Space 142 to be securely stored in data storage drives that are contained in Protection Group 123.

Further during operation of the components shown in FIG. 1, Drive Health Aware Protection Group Generation Logic 150 provides drive health aware protection groups. For example, as shown in FIG. 1, Drive Health Information Collection and Faultiness Level Calculation Logic 151 may collect drive health information from each individual data storage drive. The drive health information collected by Drive Health Information Collection and Faultiness Level Calculation Logic 151 from each data storage drive may include current values for some number of drive health parameters. Such drive health parameters may, for example, include or consist of drive health parameters such as total number of read operation errors on the drive, total number of seek operation errors on the drive, total number of relocated sectors on the drive, amount of throughput performance decrease in the drive since a previous point in time, total number of program/erase operation failures on the drive, and/or other types of drive health parameters that may be collected for each individual data storage drive.

Drive Health Information Collection and Faultiness Level Calculation Logic 151 then calculates a faultiness level of each data storage drive in Protection Groups 122 based on the drive health information collected for that drive. For example, each drive health parameter collected for a drive may be compared to a corresponding threshold value. When the current value of a drive health parameter for a drive exceeds the threshold for that parameter, the faultiness level for the drive may be incremented. As a result, the faultiness level for each drive may be equal to a total number of collected drive health parameters for the drive that have current values that exceed their corresponding thresholds. Alternatively, a weighted score may be calculated for each drive, such that the per-drive faultiness level is incremented by different increments depending on the specific drive health parameter for which the corresponding threshold is exceeded. In another alternative, each drive is determined to be either i) reliable or ii) less reliable, based on the current values of the collected drive health parameters for the drive, and then either assigned faultiness level, e.g. a faultiness level of 0 for reliable or 1 for less reliable. In another alternative, the faultiness level for each drive may be calculated as a value within a predetermined faultiness range, e.g. between 0 and 10, with 10 being the most faulty. The per-drive faultiness levels calculated by Drive Health Information Collection and Faultiness Level Calculation Logic 151 are shown in FIG. 1 by Drive Faultiness Levels 152.

Those skilled in the art will recognize that calculation of a relatively higher faultiness level for a drive does not necessarily indicate that the drive must be replaced immediately. Instead, a relatively higher faultiness level calculated for a drive may provide an indication that the probability of that drive experiencing a fault may be higher than that of a drive with a relatively lower calculated faultiness level.

Drive Health Aware Protection Group Generation Logic 150 generates a faultiness-balanced distribution of the data storage drives across the Protection Groups 122 based on the Drive Faultiness Levels 152. For example, in some embodiments, Drive Health Information Collection and Faultiness Level Calculation Logic 151 may pass Drive Faultiness Levels 152 to Faultiness-Balanced Drive Distribution Generation Logic 155. For each one of multiple distributions of the data storage drives in Physical Non-Volatile Data Storage Drives 118 across the Protection Groups 122, Faultiness-Balanced Drive Distribution Generation Logic 155 may, based on the per-drive faultiness levels in Drive Faultiness Levels 152, calculate a value of a per-protection group faultiness metric for each one of the protection groups in Protection Groups 122. The values calculated for the per-protection group faultiness metric provide a faultiness level for each protection group in a given distribution of the data storage drives across the protection groups. The range of the per-protection group faultiness metric values calculated for a given distribution of the data storage drives represents how unevenly distributed the faultiness of the data storage drives is distributed across the protection groups. Accordingly, a data storage drive distribution resulting in a relatively larger range of calculated per-protection group faultiness metric values has a more uneven distribution of individual drive faultiness across the protection groups, while a data storage drive distribution resulting in a relatively smaller range of calculated per-protection group faultiness metric values indicates a more even distribution of individual drive faultiness across the protection groups. In some embodiments, Faultiness-Balanced Drive Distribution Generation Logic 155 may calculate faultiness metric values for a current distribution of the data storage drives across the Protection Groups 122, and for one or more other candidate distributions of the data storage drives across the Protection Groups 122. Faultiness-Balanced Drive Distribution Generation Logic 155 may then select as a faultiness-balanced distribution of the data storage drives (e.g. as Faultiness-Balanced Drive Distribution 156) the distribution of the data storage drives across the Protection Groups 122 for which the calculated per-protection group faultiness metric values have the smallest range, and through which accordingly the individual drive faultiness levels are most evenly distributed.

In some embodiments, for a given data storage drive distribution, the value of the per-protection group faultiness metric may be calculated for each protection group as a total size of the protection group divided by a sum of the faultiness levels of the data storage drives contained in the protection group. Accordingly, for each protection group the value of the per-protection group faultiness metric may be calculated as:

Protection_Group_Size/Sum(Drive_Faultiness)

where:
Protection_Group_Size is either a i) total capacity of the protection group (e.g. a total of the combined capacities of the data storage drives contained in the protection group), or ii) a total amount of data currently stored in the protection group, and
Sum(Drive_Faultiness) is a sum of the faultiness levels of the data storage drives contained in the protection group.

For example, in some embodiments, Faultiness-Balanced Drive Distribution Generation Logic 155 may be configured to generate Faultiness Balanced Drive Distribution 156 based on the Drive Faultiness Levels 152 and the sizes of the individual protection groups using logic that, at least in part, solves a variation of the n-bin partition problem, such that the protection groups are considered bins of different sizes (e.g. where size is total capacity or amount of stored data per protection group), and in which the individual data storage drives are considered goods with weights equal to their individual faultiness levels, and in which the specific metric to be minimized is the above described per-protection group faultiness metric. In such embodiments, Faultiness-Balanced Drive Distribution Generation Logic 155 may, for example, be configured at least in part to use a heuristic to generate Faultiness Balanced Drive Distribution 156. Possible heuristics that may be used in such configurations include the greedy algorithm, and the largest differencing method.

Faultiness-Balanced Drive Distribution 156 may be passed to Drive Redistribution Logic 157. Drive Redistribution Logic 157 may then compare Faultiness-Balanced Drive Distribution 156 to a current distribution of the data storage drives across the Protection Groups 122. Drive Redistribution Logic 157 may then determine whether Faultiness-Balanced Drive Distribution 156 matches a current distribution of the data storage drives across the Protection Groups 122. In response to determining that Faultiness-Balanced Drive Distribution 156 does not match the current distribution of the data storage drives across the Protection Groups 122, Drive Redistribution Logic 157 may automatically redistribute the data storage drives across the Protection Groups 122 according to the Faultiness-Balanced Drive Distribution 156. Automatically redistributing the data storage drives across the Protection Groups 122 according to Faultiness-Balanced Drive Distribution 156 may be accomplished by modifying one or more data structures in RAID Mapping Logic 141 to indicate that the data storage drives in Physical Non-Volatile Data Storage Drives 118 are distributed across Protection Groups 122 according to the Faultiness-Balanced Drive Distribution 156. Automatically redistributing the data storage drives across the Protection Groups 122 according to Faultiness-Balanced Drive Distribution 156 may further include re-allocating drive extents from individual protection groups in the Protection Groups 122 to RAID extents in the corresponding logical RAID spaces according to Faultiness-Balanced Drive Distribution 156. Automatically redistributing the data storage drives across the Protection Groups 122 according to Faultiness-Balanced Drive Distribution 156 may also include moving previously stored data as necessary among the data storage drives so that the previously stored data is located on the drive extents located on the correct data storage drives according to Faultiness-Balanced Drive Distribution 156.

In some embodiments, prior to redistributing the data storage drives across the Protection Groups 122 according to Faultiness-Balanced Drive Distribution 156, Drive Redistribution Logic 157 may determine whether the Faultiness-Balanced Drive Distribution 156 provides a significant improvement over a current distribution of the data storage drives across the Protection Groups 122, and only redistribute the data storage drives across the Protection Groups 122 according to Faultiness-Balanced Drive Distribution 156 in the case where Faultiness-Balanced Drive Distribution 156 provides a significant improvement over the current distribution of the data storage drives across the Protection Groups 122. For example, Drive Redistribution Logic 157 may determine whether the Faultiness-Balanced Drive Distribution 156 provides a significant improvement over a current distribution of the data storage drives across the Protection Groups 122 by comparing i) a size of the range of the values of the per-protection group faultiness metric calculated when the current distribution of data storage drives is used, to ii) a size of the range of the values of the per-protection group faultiness metric calculated when the Faultiness-Balanced Drive Distribution 156 is used. Drive Redistribution Logic 157 may then determine that Faultiness-Balanced Drive Distribution 156 provides a significant improvement over the current distribution of the data storage drives in the case where a difference between i) the range of the values of the per-protection group faultiness metric calculated when the current distribution of data storage drives is used, and ii) the range of the values of the per-protection group faultiness metric calculated when the Faultiness-Balanced Drive Distribution 156 is used exceeds a predetermined minimum threshold.

In some embodiments, Drive Health Information Collection and Faultiness Level Calculation Logic 151 may periodically collect new drive health information from the data storage drives and recalculate Drive Faultiness Levels 152. Faultiness-Balanced Drive Distribution Generation Logic 155 may then regenerate Faultiness-Balanced Drive Distribution 156, and Drive Redistribution Logic 157 may automatically redistribute the data storage drives across Protection Groups 122 if the Faultiness-Balanced Drive Distribution 156 provides a significant improvement over the current data storage drive distribution.

Figure 2:
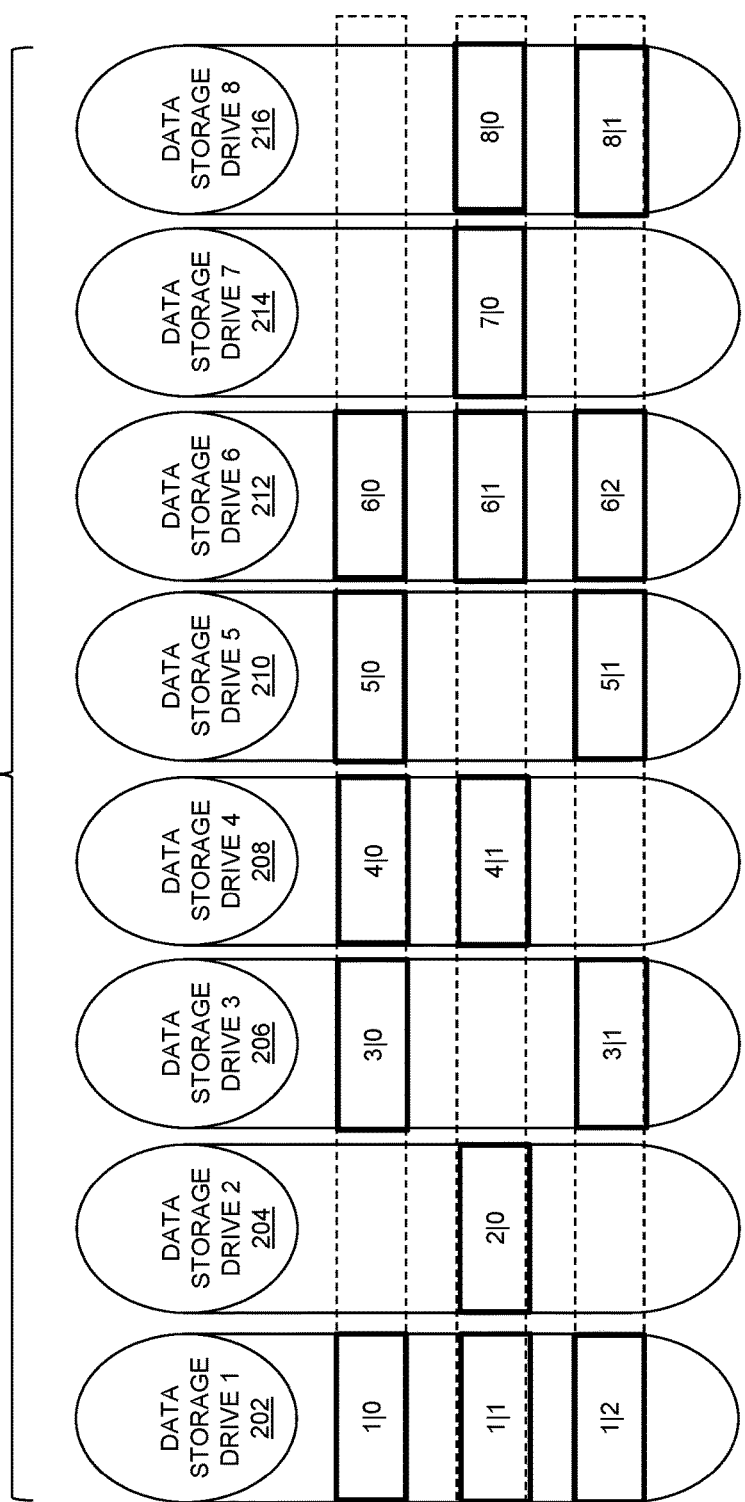
FIG. 2 is a block diagram showing an example of a RAID protection group of data storage drives and drive extents allocated from the protection group to RAID extents contained in a RAID space corresponding to the protection group.

FIG. 2 is a block diagram showing an example of a RAID Protection Group 201 containing data storage drives, and showing drive extents allocated from the Protection Group to RAID Extents 200 that are contained in a logical RAID space corresponding to Protection Group 201. As shown in the example of FIG. 2, RAID Extents 200 within a logical RAID space corresponding to Protection Group 201 may include a RAID Extent 1 that provides 4D+1P RAID-5 level RAID protection, a RAID Extent 2 that provides 4D+2P RAID-6 level RAID protection, a RAID Extent 3 that provides 4D+1P RAID-5 level RAID protection, and some number of other RAID extents.

As further shown in FIG. 2, the example of Protection Group 201 of non-volatile data storage drives may for purposes of concise illustration include eight non-volatile data storage drives, shown by Data Storage Drive 1 202, Data Storage Drive 2 204, Data Storage Drive 3 206, Data Storage Drive 4 208, Data Storage Drive 5 210, Data Storage Drive 6 212, Data Storage Drive 7 214, and Data Storage Drive 8 216.

In order to provide 4D+1P RAID-5 level RAID protection, RAID Extent 1 may be allocated five drive extents located in Protection Group 201. In order to provide 4D+2P RAID-6 level RAID protection, RAID Extent 2 may be allocated six drive extents located in Protection Group 201. In order to provide 4D+1P RAID-5 level RAID protection, RAID Extent 3 may be allocated five drive extents located in Protection Group 201.

For example, RAID Extent 1 may be allocated a set of five drive extents including a first drive extent 110, which is the first drive extent in Data Storage Drive 1 202, a second drive extent 310, which is the first drive extent in Data Storage Drive 3 206, a third drive extent 410, which is the first drive extent in Data Storage Drive 4 208, a fourth drive extent 510, which is the first drive extent in Data Storage Drive 5 210, and a fifth drive extent 610, which is the first drive extent in Data Storage Drive 6 212.

RAID Extent 2 may be allocated a set of six drive extents including a first drive extent 1|1, which is the second drive extent in Data Storage Drive 1 202, a second drive extent 2|0, which is the first drive extent in Data Storage Drive 2 204, a third drive extent 4|1, which is the second drive extent in Data Storage Drive 4 208, a fourth drive extent 6|1, which is the second drive extent in Data Storage Drive 6 212, a fifth drive extent 710, which is the first drive extent in Data Storage Drive 7 214, and a sixth drive extent 8|0, which is the first drive extent in Data Storage Drive 8 216.

RAID Extent 3 may be allocated a set of five drive extents including a first drive extent 1|2, which is the third drive extent in Data Storage Drive 1 202, a second drive extent 311, which is the second drive extent in Data Storage Drive 3 206, a third drive extent 511, which is the second drive extent in Data Storage Drive 5 210, a fourth drive extent 612, which is the third drive extent in Data Storage Drive 6 212, and a fifth drive extent 811, which is the second drive extent in Data Storage Drive 8 216.

In an example of operation, for a distribution of data storage drives across the protection groups of the data storage system in which the data storage drives assigned to Protection Group 201 consist of Data Storage Drive 1 202, Data Storage Drive 2 203, Data Storage Drive 3 206, Data Storage Drive 4 208, Data Storage Drive 5 210, Data Storage Drive 6 212, Data Storage Drive 7 214, and Data Storage Drive 8 216, a per-protection group faultiness metric value may be calculated for Protection Group 201 that is equal to a size of Protection Group 201 (e.g. a total capacity of Protection Group 1 or a total amount of data stored in Protection Group 1) divided by a sum of the individual per-drive faultiness levels determined based on per-drive health parameters collected for Data Storage Drive 1 202, Data Storage Drive 2 203, Data Storage Drive 3 206, Data Storage Drive 4 208, Data Storage Drive 5 210, Data Storage Drive 6 212, Data Storage Drive 7 214, and Data Storage Drive 8 216.

Figure 3:
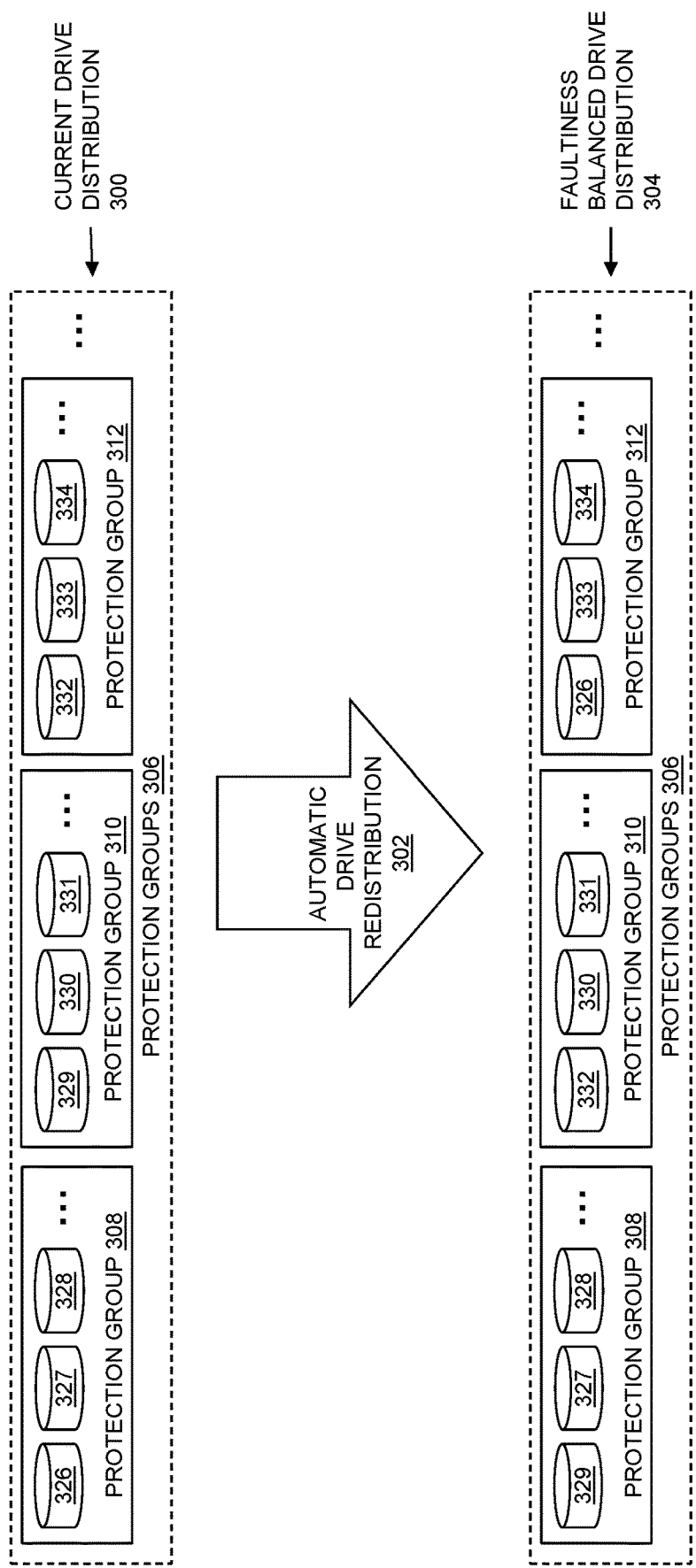
FIG. 3 is a block diagram showing an example of automatic drive redistribution from a current drive distribution to a faultiness-balanced drive distribution in some embodiments.

FIG. 3 is a block diagram showing an example of Automatic Drive Redistribution 302 from a Current Drive Distribution 300 to a Faultiness-Balanced Drive Distribution 304. As shown in FIG. 3, redistribution of the data storage drives according to Faultiness-Balanced Drive Distribution 304 may include or consist of moving at least one of data storage drive from a first one of the protection groups to a second one of the protection groups.

In the example of FIG. 3, distribution of the data storage drives in the data storage system across the Protection Groups 306 according to Current Drive Distribution 300 results in Protection Group 308 containing at least data storage drives 326, 327, and 328, Protection Group 310 containing at least data storage drives 329, 330, and 331, and Protection Group 312 containing at least data storage drives 332, 333, and 334. The disclosed technology may determine a Faultiness-Balanced Drive Distribution 304, and also determine that Faultiness-Balanced Drive Distribution 304 is different from Current Drive Distribution 300, and/or that Faultiness-Balanced Drive Distribution 304 provides a significant improvement over Current Drive Distribution 300. In response to determining that Faultiness-Balanced Drive Distribution 304 is different from Current Drive Distribution 300, and/or that Faultiness-Balanced Drive Distribution 304 provides a significant improvement over Current Drive Distribution 300, the disclosed technology may perform Automatic Drive Redistribution 302 that redistributes the data storage drives of the data storage system according to Faultiness Balanced Drive Distribution 304. As a result of performing Automatic Drive Redistribution 302, the distribution of the data storage drives in the data storage system across the Protection Groups 306 is changed such that the data storage drives in the data storage system are distributed across Protection Group 306 according to Faultiness Balanced Drive Distribution 304, such that Protection Group 308 contains at least data storage drives 329, 327, and 328, Protection Group 310 contains at least data storage drives 332, 330, and 331, and Protection Group 312 contains at least data storage drives 326, 333, and 334. During Automatic Drive Redistribution 302, data storage drive 326 was moved from Protection Group 306 to Protection Group 312, data storage drive 332 was moved from Protection Group 312 to Protection Group 310, and data storage drive 329 was moved from Protection Group 310 to Protection Group 308. In some embodiments, moving a data storage drive from one protection group to another protection group during an automatic drive redistribution may include or consist of performing a protection group shrink operation to remove the data storage drive from the source protection group, and performing a protection group extension operation to add the data storage drive to the target protection group.

Figure 4:
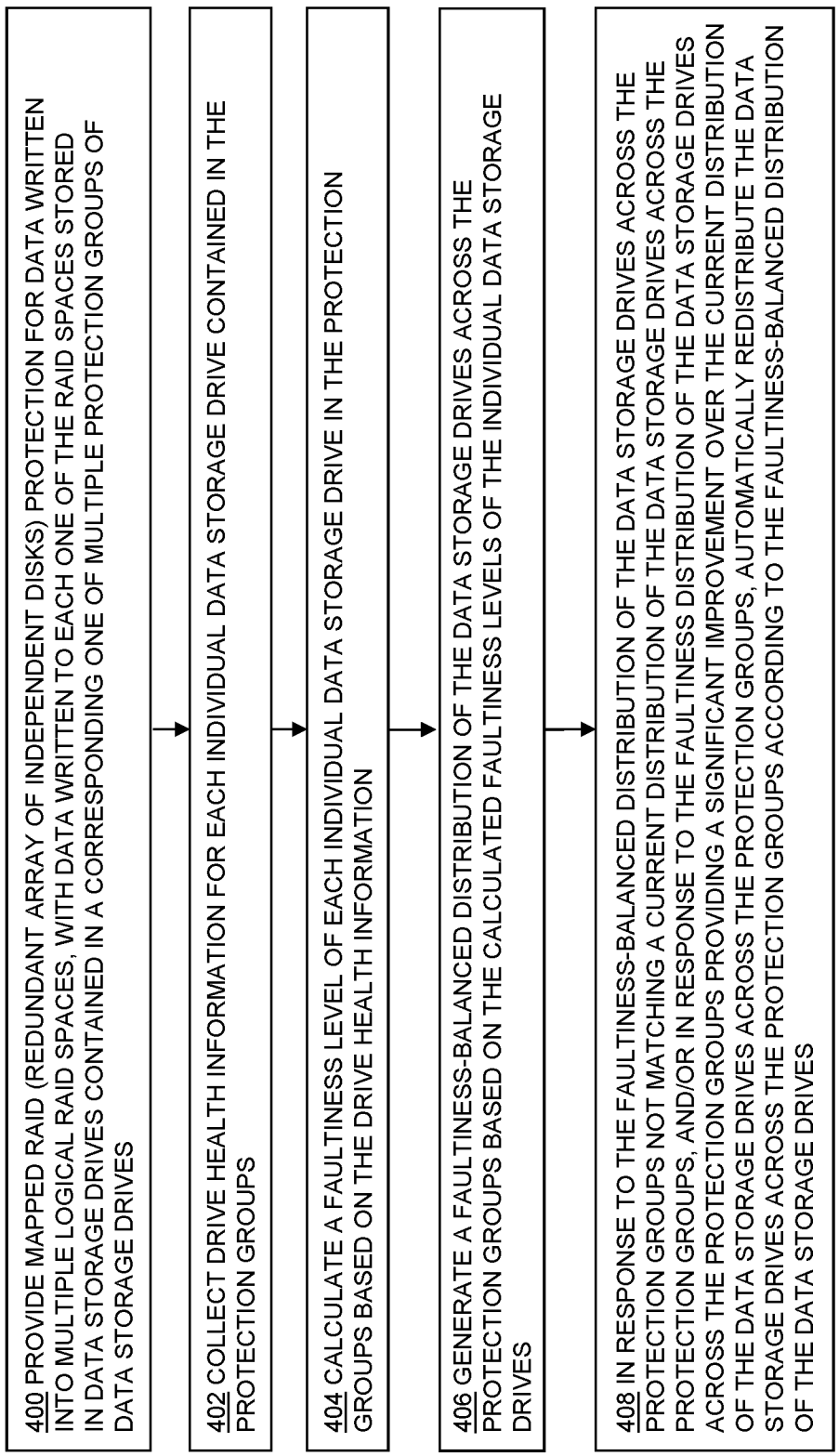
FIG. 4 is a flow chart showing an example of steps that may be performed during operation of some embodiments.

FIG. 4 is a flow chart showing an example of steps that may be performed during operation of some embodiments.

At step 400, mapped RAID protection is provided for data written into multiple logical RAID spaces, with data written to each one of the RAID spaces stored in data storage drives contained in a corresponding one of multiple protection groups of data storage drives. For example, data storage drives may be initially distributed across the protection groups according to a current distribution of the data storage drives across the protection groups.

At step 402, drive health information is collected for each individual data storage drive contained in the protection groups.

At step 404, a faultiness level is calculated for each individual data storage drive in the protection groups based on the drive health information collected at step 402.

At step 406, a faultiness-balanced distribution of the data storage drives across the protection groups is generated based on the calculated faultiness levels of the individual data storage drives.

At step 408, in response to the faultiness-balanced distribution of the data storage drives across the protection groups not matching a current distribution of the data storage drives across the protection groups, and/or in response to the faultiness distribution of the data storage drives across the protection groups providing a significant improvement over the current distribution of the data storage drives across the protection groups, the data storage drives are automatically redistributed across the protection groups according to the faultiness-balanced distribution of the data storage drives. Subsequent to step 408, the disclosed technology continues to provide mapped RAID protection for data written into the multiple logical RAID spaces, with data written to each one of the logical RAID spaces stored in data storage drives contained in a corresponding one of the protection groups of data storage drives, albeit with the data storage drives distributed across the protection groups according to the faultiness-balanced distribution of the data storage drives.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   providing mapped RAID (Redundant Array of Independent Disks) protection for data written into a plurality of logical RAID spaces, wherein data written to each one of the logical RAID spaces is stored in data storage drives contained in a corresponding one of a plurality of protection groups of data storage drives;
   collecting drive health information for each data storage drive contained in the protection groups;
   calculating a faultiness level of each individual data storage drive in the protection groups based on the drive health information; and
   generating a faultiness-balanced distribution of the data storage drives across the protection groups based on the calculated faultiness levels of the individual data storage drives, at least in part by determining a faultiness-balanced distribution of the data storage drives across the protection groups that minimizes a range of values of a faultiness metric calculated for the individual protection groups based on the faultiness levels of the individual data storage drives, wherein the values of the faultiness metric calculated for the individual protection groups is based on the sizes of the individual protection groups, and wherein the faultiness metric calculated for each protection group comprises a size of the protection group divided by a sum of the faultiness levels of the data storage drives contained in the protection group.

2. The method of claim 1, further comprising:
   determining whether the faultiness-balanced distribution of the data storage drives across the protection groups matches a current distribution of the data storage drives across the protection groups; and
   in response to the faultiness-balanced distribution of the data storage drives across the protection groups not matching the current distribution of the data storage drives across the protection groups, automatically redistributing the data storage drives across the protection groups according to the faultiness-balanced distribution of the data storage drives.

3. The method of claim 2, wherein automatically redistributing the data storage drives across the protection groups of data storage drives according to the faultiness-balanced distribution of the data storage drives includes moving at least one of data storage drive from a first one of the protection groups to a second one of the protection groups.

4. The method of claim 1, wherein the sizes of the individual protection groups used to calculate the values of the faultiness metric for the individual protection groups comprises a total capacity of each protection group.

5. The method of claim 1, wherein the sizes of the individual protection groups used to calculate the values of the faultiness metric for the individual protection groups comprises an amount of data stored in each protection group.

6. The method of claim 1, further comprising:
   determining whether the faultiness-balanced distribution of the data storage drives across the protection groups provides a significant improvement over a current distribution of the data storage drives across the protection groups; and
   in response to the faultiness-balanced distribution of the data storage drives across the protection groups providing a significant improvement over the current distribution of the data storage drives across the protection groups, automatically redistributing the data storage drives across the protection groups according to the faultiness-balanced distribution of the data storage drives.

7. A data storage system comprising:
   at least one storage processor including processing circuitry and a memory;
   a plurality of data storage drives communicably coupled to the storage processor; and
   wherein the memory has program code stored thereon, wherein the program code, when executed by the processing circuitry, causes the processing circuitry to:
      provide mapped RAID (Redundant Array of Independent Disks) protection for data written into a plurality of logical RAID spaces, wherein data written to each one of the logical RAID spaces is stored in data storage drives contained in a corresponding one of a plurality of protection groups of data storage drives,
      collect drive health information for each data storage drive contained in the protection groups,
      calculate a faultiness level of each individual data storage drive in the protection groups based on the drive health information, and
      generate a faultiness-balanced distribution of the data storage drives across the protection groups based on the calculated faultiness levels of the individual data storage drives, at least in part by causing the processing circuitry to determine a faultiness-balanced distribution of the data storage drives across the protection groups that minimizes a range of values of a faultiness metric calculated for the individual protection groups based on the faultiness levels of the individual data storage drives, wherein the values of the faultiness metric calculated for the individual protection groups is based on the sizes of the individual protection groups, and wherein the faultiness metric calculated for each protection group comprises a size of the protection group divided by a sum of the faultiness levels of the data storage drives contained in the protection group.

8. The data storage system of claim 7, wherein the program code, when executed by the processing circuitry, further causes the processing circuitry to:
   determine whether the faultiness-balanced distribution of the data storage drives across the protection groups matches a current distribution of the data storage drives across the protection groups; and
   in response to the faultiness-balanced distribution of the data storage drives across the protection groups not matching the current distribution of the data storage drives across the protection groups, automatically redistribute the data storage drives across the protection groups according to the faultiness-balanced distribution of the data storage drives.

9. The data storage system of claim 8, wherein the program code, when executed by the processing circuitry, further causes the processing circuitry to automatically redistribute the data storage drives across the protection groups of data storage drives according to the faultiness-balanced distribution of the faulty data storage drives at least in part by causing the processing circuitry to move at least one of data storage drive from a first one of the protection groups to a second one of the protection groups.

10. The data storage system of claim 7, wherein the sizes of the individual protection groups used to calculate the values of the faultiness metric for the individual protection groups comprises a total capacity of each protection group.

11. The data storage system of claim 7, wherein the sizes of the individual protection groups used to calculate the values of the faultiness metric for the individual protection groups comprises an amount of data stored in each protection group.

12. The data storage system of claim 7, wherein the program code, when executed by the processing circuitry, further causes the processing circuitry to:
   determine whether the faultiness-balanced distribution of the data storage drives across the protection groups provides a significant improvement over a current distribution of the data storage drives across the protection groups; and
   in response to the faultiness-balanced distribution of the data storage drives across the protection groups providing a significant improvement over the current distribution of the data storage drives across the protection groups, automatically redistribute the data storage drives across the protection groups according to the faultiness-balanced distribution of the data storage drives.

13. A computer program product including a non-transitory computer readable medium having instructions stored thereon, wherein the instructions, when executed on processing circuitry, cause the processing circuitry to perform the steps of:
   providing mapped RAID (Redundant Array of Independent Disks) protection for data written into a plurality of logical RAID spaces, wherein data written to each one of the logical RAID spaces is stored in data storage drives contained in a corresponding one of a plurality of protection groups of data storage drives;
   collecting drive health information for each data storage drive contained in the protection groups;
   calculating a faultiness level of each individual data storage drive in the protection groups based on the drive health information; and
   generating a faultiness-balanced distribution of the data storage drives across the protection groups based on the calculated faultiness levels of the individual data storage drives, at least in part by determining a faultiness-balanced distribution of the data storage drives across the protection groups that minimizes a range of values of a faultiness metric calculated for the individual protection groups based on the faultiness levels of the individual data storage drives, wherein the values of the faultiness metric calculated for the individual protection groups is based on the sizes of the individual protection groups, and wherein the faultiness metric calculated for each protection group comprises a size of the protection group divided by a sum of the faultiness levels of the data storage drives contained in the protection group.

* * * * *